Nov. 4, 1947.  W. T. STEWART  2,430,255
METHOD OF MAKING ALKALI METAL SELENIDES
Filed Dec. 31, 1945
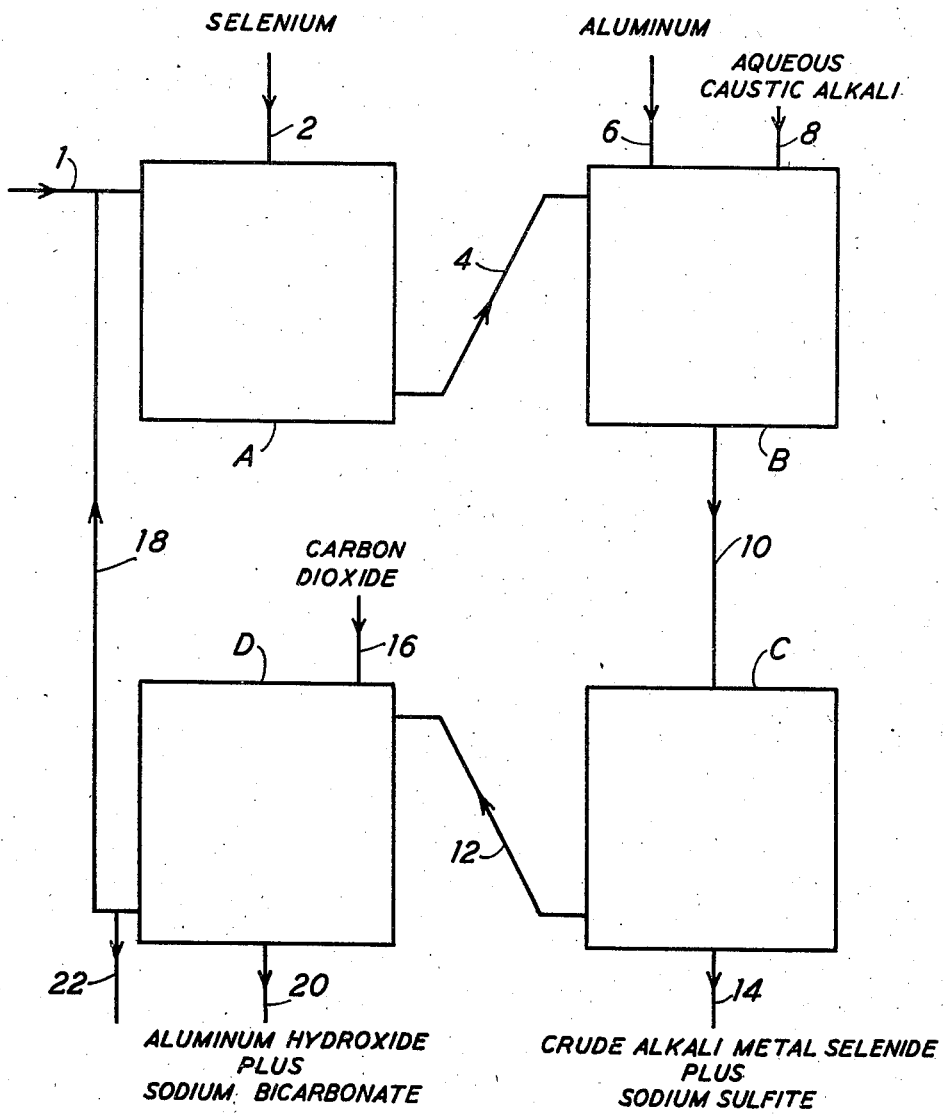
INVENTOR
WILLIAM T. STEWART
ATTORNEYS Patented Nov. 4, 1947

2,430,255

UNITED STATES PATENT OFFICE 2,430,255

METHOD OF MAKING ALKALI METAL SELENIDES

William T. Stewart, Berkeley, Calif., assignor to California Research Corporation, San Francisco, Calif., a corporation of Delaware Application December 31, 1945, Serial No. 638,567

17 Claims. (Cl. 23—50)

The present invention relates to the production of alkali metal selenides.

Alkali metal selenides are useful in the preparation of medicinals, organic intermediates, dyestuffs, dye intermediates, and organic selenides. In the latter group, there are those organic selenium compounds, particularly dialkly selenides, which are useful as antioxidants and stabilizers for organic substances, notably, for mineral lubricating oils.

The use of alkali metal selenides as intermediates in the preparation of organic selenium compounds has been hampered by the costliness or other disadvantages of the methods which heretofore have been available for the preparation of the alkali metal selenides.

One such prior method used for the preparation of alkali metal selenides is the reaction of sodium with selenium to prepare sodium selenide in accordance with the following equation:

(1) $\quad 2Na+Se \rightarrow Na_2Se$ using liquid ammonia as the solvent. The reaction of the metal directly without the use of a solvent takes place with explosive violence. If a solvent such as liquid ammonia is used, a further disadvantage is the possibility of sodamide formation, which formation is catalyzed by the presence of impurities, such as iron.

It is an object of this invention to provide a more advantageous method for the production of alkali metal selenides.

It is another object of the present invention to provide a safe and economical method of obtaining crystalline alkali metal selenides using inexpensive starting materials and using water as the reaction solvent.

It is a further object of this invention to provide a method of making alkali metal selenides, which method is safe, convenient to carry out on a commercial scale, employs inexpensive material, and which method allows substantial recovery of certain of the starting materials.

Other and further important objects of this invention will become apparent from the following description and the appended claims.

I have discovered that alkali metal selenides can be prepared conveniently and economically, without the necessity of reacting selenium with free alkali metal, by reducing alkali metal selenosulfates.

Alkali metal selenosulfates are salts having the structure

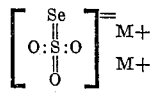

where M+ is an alkali metal ion, the ions of lithium, sodium and potassium. See Mellor, "A Comprehensive Treatise on Inorganic and Theoretical Chemistry," vol. 10, pages 922 and following, for the structure and a method of preparing these salts.

The reduction of alkali metal selenosulfate (using aluminum by way of example as the reducing agent) proceeds as follows:

(2) $2Al+3M_2SeSO_3+8NaOH \rightarrow$
$\quad\quad 2NaAlO_2+3Na_2Se+4H_2O+3Na_2SO_3$ The method of the invention may be accomplished by dissolving alkali metal selenosulfate in water or other suitable solvent and reducing the dissolved salt. However, I have discovered that a much more convenient and economical way of accomplishing the method of the invention is to dissolve selenium in an aqueous alkali metal sulfite solution, which produces alkali metal selenosulfate in accordance with the reaction (3) $\quad\quad Se+M_2SO_3 \rightarrow M_2SeSO_3$ and then reduce the dissolved selenium.

By "dissolving" or "to dissolve" selenium in aqueous alkali metal sulfite solution, it is meant to include Reaction 3 above and such other reactions, whether physical or chemical, as may occur and which result in incorporating the selenium in the water in the form of a solution. By "dissolved" selenium is meant the dissolved products of all these reactions.

In the preferred embodiment of the invention, selenium is dissolved in aqueous sodium or potassium sulfite solution (according to whether sodium or potassium selenide is the desired end product); the dissolved selenium is subjected to the reducing action of a metallic reducing agent, preferably aluminum or zinc, in the presence of caustic soda or caustic potash (which is dissolved in the solution); and the resulting alkali metal selenide is recovered from the aqueous reaction mixture, as by cooling and allowing the alkali metal selenide to crystallize out.

The aqueous alkali metal sulfite solution may contain 10% or less to 50% or more of alkali metal sulfite, about 15% to 25%, being preferred. These percentages are by weight based on sulfite solution.

The selenium may be dissolved in aqueous sulfite solution merely by heating it with the solution; or the selenium and solid sulfite may be heated together with water. Proportions of selenium ranging from 15% or less to 40% or more may be used, based on weight of dry sulfite, about 25% to 30% being preferred. Some of the selenium may not dissolve; if not, it is not necessary to remove the undissolved selenium, though it is preferred to remove it.

Having dissolved the selenium in the sulfite solution, the reduction may be carried out by adding the calculated amount of reducing agent to the solution and then gradually adding the caustic alkali, or it may be carried out by adding the calculated amount of caustic alkali to the sulfite solution and then gradually adding the reducing agent. Or the reduction may even be accomplished by adding the reducing agent and the caustic alkali gradually and simultaneously to the solution.

It is preferred to add all the reducing agent to the solution and then add the caustic alkali gradually; by control of the rate of addition of the alkali, a nice control over the reaction rate can be accomplished. An excess of reducing agent is preferably used and this reducing agent is preferably sheet or granular aluminum or mossy or powdered zinc. The caustic alkali may be added in the form of an aqueous solution of 30% or lesser to 80% or greater strength, or even in dry form, but an aqueous solution of about 35% to 50% strength is preferred. The reaction mixture is agitated while the caustic alkali is being added. Usually slight heating is required to initiate the reaction, which then proceeds exothermically and requires control. The reaction may be controlled by cooling and/or by the rate of addition of caustic alkali. Better yields of alkali metal selenide are obtained by continuing the agitation and supplying heat to the reaction mixture for some considerable time after all the caustic alkali has been added.

Upon completion of the reaction (marked by cessation of evolution of hydrogen), the reaction mixture can be cooled to room temperature (or lower, if necessary) to crystallize out alkali metal selenide. It is a marked advantage of the invention that among the products of reaction are alkali metal sulfite and alkali metal aluminate or zincate (according to whether aluminum or zinc is used as the reducing agent), and these salts, being more water-soluble than the corresponding alkali metal selenide, depress the solubility of the latter and salt it out. Thus, provided suitable concentrations and proportions of reactants have been used, upon cooling the reaction mixture to room temperature, a precipitate is obtained containing the larger part of the alkali metal selenide and a mother liquor is obtained containing about 50% of the weight of the original alkali metal sulfite and the larger part of the alkali metal aluminate or zincate.

By cooling the reaction mixture fast or slowly, a crop of small or large crystals, respectively, may be obtained.

The precipitated alkali metal selenide may be used directly in organic synthesis, or it may be purified by recrystallization from hot alcohol. The mother liquor may be treated to recover alkali metal selenide and alkali metal sulfite. The recovered alkali metal sulfite (as well as that recovered from the first crop of crystals) may be reused in the process of the invention; this constitutes an important economy. Thus, the mother liquor may be treated with carbon dioxide to effect the removal of the alkali metal aluminate as alkali bicarbonate and aluminum hydroxide, both of which precipitate out. A mother liquor is produced containing alkali metal sulfite and any unreacted alkali metal selenosulfate. The sulfite in this mother liquor will ordinarily amount to about 50% of the weight of the original sulfite. This mother liquor may be recycled and reused in a subsequent preparation of alkali metal selenide.

Alkali metal selenides are readily oxidized by air to produce free selenium. Therefore, throughout the reaction period and until the alkali metal selenide is ready for use, it is advisable to keep the reaction mixture and the product free from air. This can be accomplished by blanketing the reaction mixture and the product with a non-oxidizing gas such as nitrogen or carbon dioxide.

In the accompanying drawing, which accompanies and forms a part of this specification, there is shown diagrammatically the preferred embodiment of the invention, including the recovery and the recycling of the regenerated alkali metal sulfite.

In the single figure of the drawing are shown reaction vessels A and B and recovery vessels C and D. An aqueous solution of alkali metal sulfite is supplied to reaction vessel A through line 1. Selenium is supplied through conduit 2 to reaction vessel A, in which the selenium is dissolved in the aqueous alkali metal sulfite solution to produce an aqueous solution of alkali metal selenosulfate, which is then introduced through line 4 into reaction vessel B. The desired quantity of aluminum or zinc is charged to vessel B through conduit 6. Aqueous caustic alkali is then introduced through line 8 into vessel B to bring about the reduction of alkali metal selenosulfate to alkali metal selenide and alkali metal sulfite. The reaction mixture is then introduced through line 10 into recovery vessel C, where it is cooled to precipitate alkali metal selenide, which is removed through conduit 14 after the mother liquor has been drained from vessel C to vessel D through line 12. This crude alkali metal selenide may be further purified by recrystallization. The mother liquor in vessel D is then treated through line 16 with carbon dioxide to precipitate out aluminum hydroxide and alkali metal bicarbonate. The mother liquor of vessel D, consisting mainly of an aqueous solution of alkali metal sulfite, is recycled through lines 18 and 1 to reaction vessel A. The aluminum hydroxide and alkali metal bicarbonate in vessel D are then removed through conduit 20. To prevent undue accumulation of unwanted salts, a portion of the recycled solution may be bled off through line 22.

In the procedure described above with reference to the drawing, the various steps of the procedure (e. g., forming selenosulfate solution, reduction, crystallization of alkali metal selenide and recovery of alkali metal sulfite) have been shown as carried out in separate pieces of equipment. However, modifications will be apparent to one skilled in the art; for example, two or more steps may be carried out in the same piece of equipment.

As stated, alkali metal selenosulfate can be dissolved directly in water instead of being formed in situ, and the dissolved selenosulfate subjected to reduction. In this event, the same reduction and recovery procedure as described above may be employed. Also, other reaction media may replace water (e. g., alcohol), and other reducing agents may replace zinc and aluminum, (e. g., phosphorus). If a non-aqueous reaction medium is used, in which the reactants are insoluble or only slightly soluble, the reactants may be kept dispersed in the reaction medium by agitation. The above-described procedure and starting materials are, however, preferred. If alkali metal selenosulfate is dissolved in water directly, it may be dissolved in the amount of 10% or less to 40% or more, preferably 20% to 25% by weight based on solution.

If the alternative reduction procedure described above is used, wherein the caustic alkali is first added to the solution and then reducing agent is added gradually, an excess of caustic alkali will normally be added (e. g., about 50% to 200% excess) and the reducing agent will be added in amount sufficient to complete the reduction or carry it as far as desired. Otherwise, more or less the same procedure may be used as in the first mentioned, preferred embodiment wherein the reducing agent is first added, then the caustic alkali.

The following specific example will further serve to illustrate the practice and advantages of this invention.

A mixture of 79 gm. of metallic selenium, 570 gm. of sodium sulfite heptahydrate, and one liter of water was stirred and heated at 175° F. for one-half hour in a glass reaction vessel to produce an aqueous solution of sodium selenosulfate. The reaction vessel was purged with nitrogen and 45 gm. of aluminum turnings was added, and the stirring was continued. A solution of 187 gm. of sodium hydroxide in 330 gm. of water was added to the reaction vessel over a period of twenty-five minutes with external cooling to maintain the reaction mixture at 180°–200° F. Stirring and heating at 180° F. to 200° F. was continued for two hours after the completed addition of the sodium hydroxide solution. The reaction mixture was allowed to cool to room temperature and stand for fifteen hours, protected from air by a blanket of nitrogen to prevent oxidation, which takes place readily in the presence of air. Observation of the cooled reaction mixture showed that it consisted of a mass of light crystals (hydrated sodium selenide containing a small amount of sodium sulfite) and a dark, red-brown mother liquor. This mother liquor has decanted off of the crystalline sodium selenide. This crude selenide can be purified by crystallization from ethyl alcohol or it can be used directly in organic synthesis. A 94.4% conversion of selenium to crystalline sodium selenide was effected.

Higher yields of crystalline sodium selenide may be obtained by further working up the above-noted dark, red-brown mother liquor. This mother liquor may be treated with carbon dioxide to effect the removal of the sodium aluminate as sodium bicarbonate and aluminum hydroxide, both of which precipitate out. A mother liquor is produced containing alkali metal sulfite and any unreacted alkali metal selenosulfate. The sulfite in this mother liquor will ordinarily amount to about 50% of the weight of the original sulfite. This mother liquor may be recycled and reused in a subsequent preparation of sodium selenide; thus reducing the over-all cost of the crystalline sodium selenide.

While the above specific examples and detailed description of the invention set forth the preferred embodiment of the invention, still other embodiments and variants are within the scope of this invention.

I claim:

1. In the method of producing alkali metal selenide wherein a soluble compound of selenium dissolved in a solvent is subjected to the action of a reducing agent, the improvement which comprises forming a solution of alkali metal selenosulfate and reducing the dissolved alkali metal selenosulfate to alkali metal selenide and alkali metal sulfite.

2. The improvement of claim 1, wherein said alkali metal is sodium.

3. The improvement of claim 1, wherein said alkali metal is potassium.

4. A method of producing alkali metal selenide, which comprises forming an aqueous solution of alkali metal selenosulfate and reducing the dissolved alkali metal selenosulfate to alkali metal selenide and alkali metal sulfite in the presence of caustic alkali by means of a metallic reducing agent.

5. The method of claim 4, wherein said metallic reducing agent is aluminum.

6. The method of claim 4, wherein said metallic reducing agent is zinc.

7. A method of producing alkali metal selenide, which comprises dissolving selenium in an aqueous solution of alkali metal sulfite and reducing the dissolved selenium to alkali metal selenide and alkali metal sulfite by the action of a metallic reducing agent in the presence of caustic alkali.

8. The method of claim 7, wherein said metallic reducing agent is aluminum.

9. The method of claim 7, wherein said metallic reducing agent is zinc.

10. A method of producing alkali metal selenide, which comprises reacting selenium and alkali metal sulfite in water to produce an aqueous solution of the reaction product and reducing the dissolved selenium to alkali metal selenide and alkali metal sulfite by the action of a metallic reducing agent in the presence of caustic alkali.

11. The method of claim 10, wherein said metallic reducing agent is aluminum.

12. The method of claim 10, wherein said metallic reducing agent is zinc.

13. A method of producing alkali metal selenide, which comprises reacting selenium with alkali metal sulfite in aqueous solution to form a solution of a soluble selenium compound and reducing said soluble selenium compound to alkali metal selenide and alkali metal sulfite by gradually adding aqueous caustic alkali solution to a mixture of a metallic reducing agent and said solution of soluble selenium compound.

14. A method of producing alkali metal selenide, which comprises forming a reaction mixture of metallic aluminum and an aqueous solution of alkali metal selenosulfate, then adding aqueous caustic alkali solution of a concentration and at a rate such that the reaction proceeds at a substantial but controllable rate, and in quantity sufficient substantially to complete the reaction, and thereafter cooling the reaction mass to crystallize out alkali metal selenide and effect a separation thereof from alkali metal sulfite.

15. A method of producing alkali metal selenide, which comprises forming a reaction mixture of metallic zinc and an aqueous solution of alkali metal selenosulfate, then adding aqueous caustic alkali solution of a concentration and at a rate such that the reaction proceeds at a substantial but controllable rate, and in quantity sufficient substantially to complete the reaction, and thereafter cooling the reaction mass to crystallize out alkali metal selenide and effect a separation thereof from alkali metal sulfite.

16. A method of producing alkali metal selenide, which comprises gradually adding metallic aluminum to an aqueous solution of alkali metal selenosulfate, said solution of selenosulfate containing caustic alkali.

17. A method of producing alkali metal selenide, which comprises gradually adding metallic zinc to an aqueous solution of alkali metal selenosulfate, said solution of selenosulfate containing caustic alkali.

WILLIAM T. STEWART.